Figure 1:
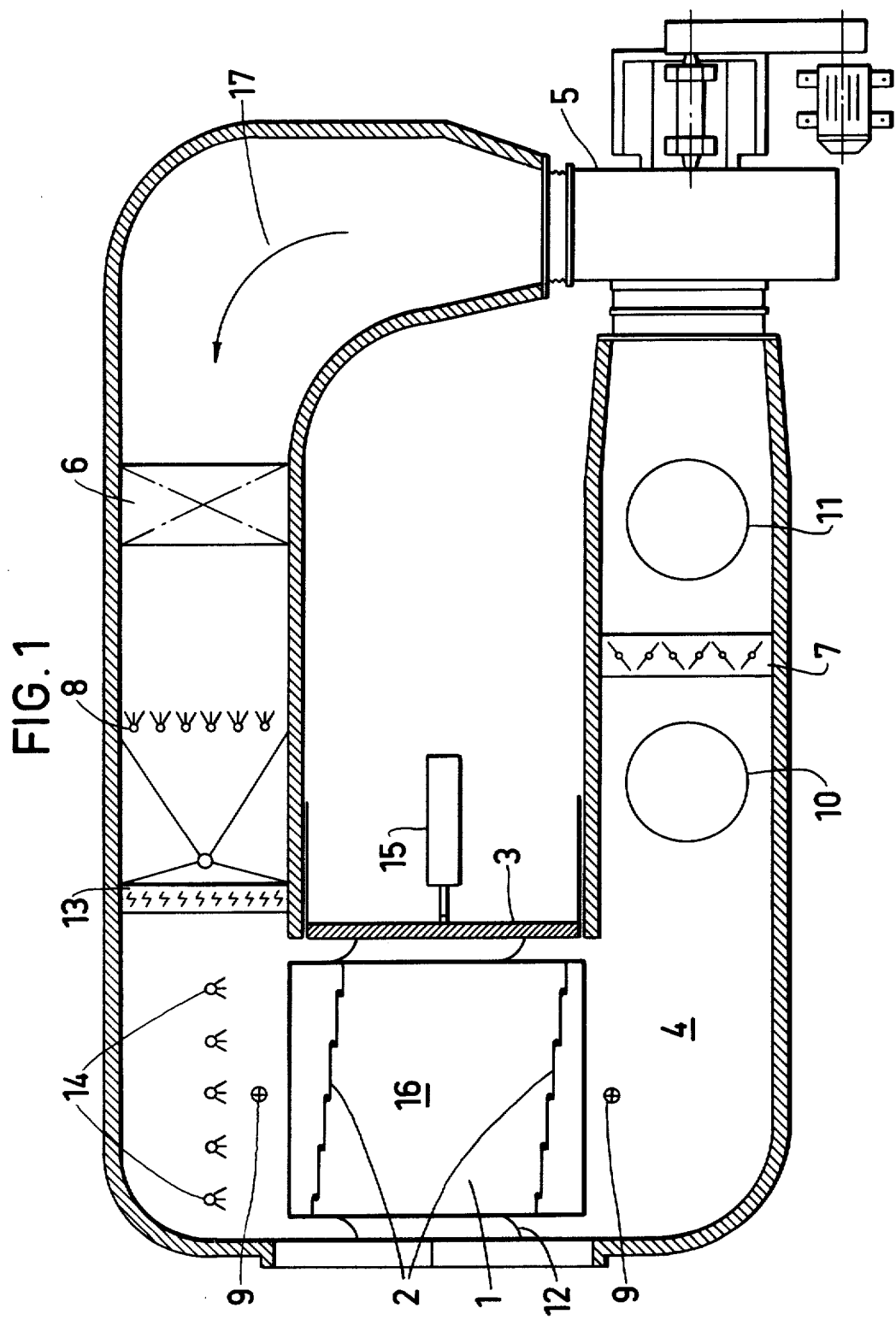

United States Patent [19]
Back et al.

[11] 3,875,680

[45] Apr. 8, 1975

[54] APPARATUS FOR PRODUCING WET STIFF CORRUGATED BOARD

[75] Inventors: Ernst Ludvig Back, Lidingo; Rolf Gote Anderson, Sollentuna, both of Sweden

[73] Assignee: Svenska Traforskningsinstitutet, Stockholm, Sweden

[22] Filed: Apr. 11, 1973

[21] Appl. No.: 349,941

[30] Foreign Application Priority Data
Apr. 18, 1972 Sweden.............................. 5005/72

[52] U.S. Cl........................... 34/61; 34/67; 34/104; 34/151
[51] Int. Cl.. F26b 21/02; F26b 21/06; F26b 21/08; F26b 21/10; F26b 21/12; F26b 25/06
[58] Field of Search .............. 34/12, 13, 13.4, 13.8, 34/219, 201, 202, 226, 242, 61, 67, 78, 104, 151; 165/19, 20, 21; 156/497, 498, 499; 118/66

[56] References Cited
UNITED STATES PATENTS
1,677,963  7/1928  Ford............................ 34/13.8 X R
2,064,965  12/1936  Will............................... 34/219 X R Primary Examiner—William A. Powell
Assistant Examiner—Brian J. Leitten
Attorney, Agent, or Firm—Cushman, Darby & Cushman

[57] ABSTRACT

Corrugated board is made wet stiff by blowing hot air through the flutes thereof and subsequently blowing cooling and remoistening air therethrough. During the treatment the corrugated board is stationarily placed in a chamber sealed at all sides, the chamber being connected with a recirculating channel provided with circulation blower, heat batteries, air exchange valves, vapour and hot water nozzles and means for controlling the circulation air.

10 Claims, 2 Drawing Figures

APPARATUS FOR PRODUCING WET STIFF CORRUGATED BOARD

This invention relates to improvements in a method for the production of wet-stiff corrugated board, above all without extra chemical additives. The method is also useful for increasing the wet stiffness of corrugated board to which a thermosetting resin has been added.

It is well-known that absorption of moisture changes the mechanical properties of cellulose fibres and the paper materials significantly, in the first place so that the stiffness, Young's modulus and strength are reduced. For stiff packaging materials, such as corrugated board this loss of stiffness limits considerably the general usefulness of the material at high atmospheric relative humidities or in wet condition. Different techniques have therefor been used in attempts to wet stiffen corrugated board. The term "wet stiffen" refers to the compression strength of corrugated board remaining after it has been exposed to a high relative humidity, condensed moisture or water.

A limited wet stiffness has been attained in various ways. One is by making the surfaces of the fibres, e.g. on the outer layer of the liner hydrophobic by means of curtain waxing, wax impregnation, for instance according to the Resco Cascade method, or so-called dry waxing of the whole corrugated board or some part thereof, for instance the corrugated layer (Swedish lay-open print 310,593). Another method is to introduce a plastic film or a plastic layer into one of the components of the corrugated board or to the outside of the corrugated board (Swedish Pat. No. 341,516). Both these latter methods provide a more or less impervious diffusion barrier delaying the absorption of moisture into the whole corrugated board or its components. Fibres that stick out through the plastic or wax layers or the cut edges of the corrugated board, for instance in corners and lids, will however permit moisture to diffuse into the material.

Alternatively it is possible to add to the corrugated board or one of its components resins, which provide a more or less permanent wet strength and wet stiffness. The greatest problem is to find a suitable method of adding and subsequently curing these resins. According to the Swedish patent application 10958/69 it is, for instance, suggested that phenolic resins or other thermosetting resins be added to the paper components of the corrugated board and that these resins be cured before the corrugated board machine. As is usually the result when thermosetting resins are added, paper obtained in this way is so dry and brittle that it must be strongly moistened before the corrugated board machine. Moreover a humectant must be added to the finished corrugated board when this is to be creased or scored, so that the wet stiffness is locally reduced. Other examples of additions of resins exist, e.g. phenol resin (Fahey, D.J.: Tappi 45(9):192A(1962). Other additions have also been used, such as diisocyanate. (Morak, A. J. and Ward, K.: Tappi, 53(4): 652,53(6): 1055,53(12):2278(1970)).

Consequently it is well-known that thermosetting resins, such as phenolic, melamine or carbamide resins or diisocyanates or mixtures thereof can be used for increasing the wet stiffness of corrugated board. The problem has been to find simple methods of curing the resin and of converting the dry and above all brittle paper to finished corrugated board and of converting the corrugated board to boxes.

If, on the other hand, the corrugated board or one of its components is impregnated with a resin that is cured only after the preparation of the corrugated board and if the corrugated board in immediate connection with the curing is conditioned to moisture ratio of about 7 – 10 percent, the problems with the brittleness are in the final converting of the corrugated board considerably reduced. An important property of wet stiff corrugated board is good wet strength in the adhesive bond keeping together the framework formed by the corrugated board. This can, for example, be obtained by adding thermosetting resins to the adhesive, but these constituents in the adhesive are often difficult to cure sufficiently in the corrugated board machine.

A restriction exists for the use of thermosetting resins in corrugated board intended for the packaging of foodstuffs, which is the most important market for wet stiff corrugated board. The package must not impart a foreign odour or taste to the foodstuffs, and the amount of low molecular residues, such as phenols or aldehydes, permitted per surface unit surface area of paper is maximized (Code of Federal Regulations, Title 21, Part 121, Subpart F, Jan. 1, 1970 and Kunststoffe im Lebensmittelverkehr, Empfehlungen der Kunststoff-Kommision des Bundesgesundheitsamtes 1970).

According to the present invention wet stiffness is obtained without addition of thermosetting resins, but the inventions may also be used for achieving a higher wet stiffness of corrugated board when it contains thermosetting resins or adhesives with thermosetting resins. For the latter corrugated board with thermosetting resins the problems in the subsequent converting are reduced. The present method is characterized in that stacks of corrugated board are treated batchwise by first blowing prethermostated hot air of at least 170°C through the flutes of the corrugated board, after which colder cooling air and finally preconditioned cooling air of maximum 90°C and at least 60 percent relative moisture are blown through the flutes.

This invention also is concerned with a device for making corrugated board wet stiff. This invention is concerned with hot air treatment of corrugated board, above all corrugated board without thermosetting additives, but also when any of the paper components of the corrugated board is provided with thermosetting additives. This device comprises a chamber means for receiving at least one stack of corrugated board, the flat surfaces thereof being substantially horizontal, means for sealing the top, bottom and sides of said at least one stack, the flutes of the corrugated board being connected in both ends with a recirculation channel, which is provided with circulation blower, heat batteries, air exchange valves, vapour and hot water nozzles and means for controlling the circulation air.

Figure 2:
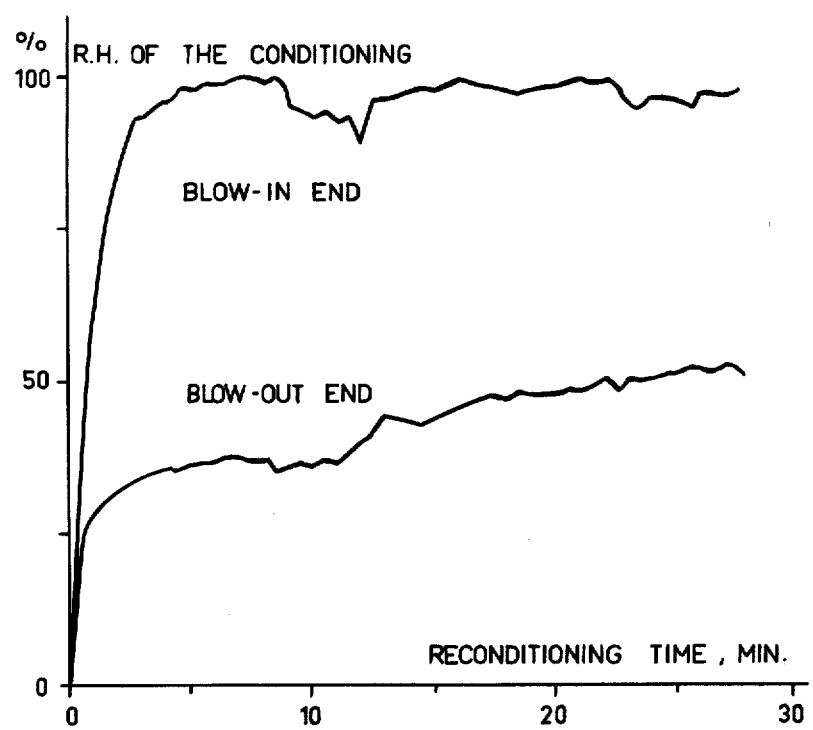

The invention will be disclosed more in detail referring to the attached drawings. In FIG. 1 there diagrammatically is shown a plan view of a device according to the invention and FIG. 2 shows a diagram of the reconditioning time versus the relative humidity of the air.

It is appropriate that the hot air treatment of the finished corrugated board be carried out at an air velocity of 3 to 15 m/s (meters/second), the temperature of the air being 170° to 250°C, preferably 185° to 210°C. Air velocities lower than 3 m/s lead to the development in the material of large temperature gradients, which cannot be eliminated during a reasonable time of treatment. Large temperature gradients mean a risk of self-ignition and also cause too large a difference between the moisture contents at the blow-in and blow-out ends of the corrugated board stack after the reconditioning. The air is preferably blown by means of a fan, which means that an air velocity in excess of 15 m/s results in unnecessary costs and unnecessarily expensive fans and air channels. In order to obtain air velocities of 3 – 15 m/s either a centrifugal blower or an axial fan may be chosen depending on the construction and size of the plant. For big plants a centrifugal blower is necessary, permitting the hot air to be recycled for better thermal economy, the maximum operation temperature of a centrifugal blower with cooling discs being about 350°C. For smaller plants an axial fan can be used, the maximum working temperature being 70°C. In this case the hot air cannot be recycled, but new hot air must be continuously generated for the through blowing treatment.

It has been found technically necessary to seal the stack of corrugated board carefully so that all air is forced to pass through the flutes of the corrugated board.

It is then a practical advantage if the top sealing of the corrugated board stack is carried out so that stacks of different height, i.e., batches of different size, can be hot air treated, the stack preferably having a height of 1.5 to 3.0 m. This top sealing is for instance carried out so that sealing devices in the treatment chamber are vertically adjustable by hydraulic means so that the sealing devices pressed against the top of the corrugated board stack with a sufficient pressure.

Moreover, it is necessary that the lateral sealing of the stack of corrugated board be carried out so that stacks of different width, i.e., corrugated blanks for different box formats can be hot air treated, preferably stacks having a width of 0.5 to 2.0 m. This lateral sealing is for instance carried out by one wall of the treatment chamber contructed so that it can be pushed hydraulically being pushable along grooves or guides for coarse alignment. Moreover, the walls of the treatment chamber can be provided with resilient sealing plates aligned inwardly against the air flow so that they are pressed against the sides of the stack of corrugated board by the air flow.

The hot air treatment after the corrugated board machines is usually carried out when the corrugated board is already provided with a number of scores across the flutes of the corrugated board. This compression of the flutes only causes a moderate increase in the pressure drop of the passing air flow as compared with that of unscored corrugated board. An increase of 10 mm water pressure in the pressure drop, from 105 mm to 115 mm, is for instance obtained in a stack 1 m in length.

The present invention can be applied to A-, C- or B-flute corrugated board and to corrugated board of single double or triple wall type.

In the hot air treatment of corrugated board according to this invention a rapid wet stiffening takes place with little dry brittleness followed by a slow increase in wet stiffening with a rapid increase in dry brittleness. At 190°C a rapid wet stiffening with little dry brittleness takes place for instance during the first 10 to 20 minutes. In the same way there is at other hot air temperatures a certain optimal treatment time obtaining good wet stiffness with only little dry brittleness. The optimal treatment time decreases with increasing treatment temperature. In Table 1 shows a typical example of the optimal treatment time for a number of temperature levels for a corrugated board, consisting of surface layers (liners) partly made of recovered fibres, basis weight 2 × 210 g/m$^2$, a corrugating medium of semichemical hardwood pulp, C-flute, basis weight 146 g/m$^2$ and a starch adhesive wet-strengthened with a resorcinol resin.

Table 1

| Temperature °C. | Example of optimal treatment time | |
|---|---|---|
| 150 | 320 | min. |
| 170 | 80 | '' |
| 180 | 40 | '' |
| 190 | 20 | '' |
| 200 | 10 | '' |
| 210 | 5 | '' |
| 220 | 150 | sec. |
| 230 | 75 | '' |
| 240 | 40 | '' |
| 250 | 20 | '' |
| 270 | 5 | '' |

The technical advantage of carrying out the hot air treatment at 170°– 250°C, preferably 185°– 210°C appears from the Table. Temperatures below 170°C involve great capital investment, although the process will then proceed very slowly, and at temperatures above 250°C the process will be difficult to control, which inter alia involves a considerable risk of self-ignition.

The corrugated board is formed from liner and corrugated medium components which are bonded together by sizing with an adhesive selected from the group consisting of synthetic adhesives, starches, and mixtures thereof.

It has been found that if minor amounts of metal salts having a metal ion with a high redox potential or a little amount of acid are added to one or several of the components of the corrugated board, e.g. by impregnation, the optimal treatment time will be shorter.

It is absolutely essential that the hot corrugated board be cooled after the hot air treatment and reconditioned to a normal or somewhat higher than normal moisture content in order to make its converting and finishing easier and to eliminate the risk of self-ignition. In the batchwise treatment described in the present invention this cooling and reconditioning take place in direct connection with and preferably in the same chamber as the hot air treatment. In a plant with recycled air, the recycled air can for instance be cooled by means of one or several built-in-vapour-water-nozzles so that the air is cooled in a short time to 90°C or less at the same time as it is moistened. External air can also be used, especially for the first part of the cooling if the chamber is provided with a special intake and vent. It may be necessary to reverse the air flow so that the moist conditioning air alternately and after given time intervals is blown into the one or the other end of the corrugated board stack. As conditioning can easily be controlled so that any desired moisture content is obtained, a moisture content suitable for converting is chosen, preferably a moisture ratio of 7 – 10 percent. In this way the use of a special humectant before converting is possible avoided.

Corrugated board treated according to the present invention can advantageously also be provided with a surface coating, e.g. by curtain waxing. Such a combination of internal wet stiffness of the material with an impervious or hydrophobic layer on one or two sides has shown the best wet stiffness in a finished box in climates of different humidity.

The device shown in FIG. 1 consists of a treatment chamber or channel 1, where the stack of the corrugated board is stationarily placed with a good sealing 2,3 against all sides so that the hot air, the cooling air and the moistened conditioning air necessary for the treatment is forced to pass through the flutes, i.e., fluting channels in the corrugated board of the stack. A recirculation channel 4 is connected to this and contains a circulation blower 5, heat batteries 6, a valve 7 for exchange of air, vapour and hot water nozzles 8 for cooling and wetting of the air and control means 9 for the circulating air. In FIG. 1 also a hot air vent 10, an intake 11 for cooling air and a dewatering grating 12 are shown.

The treatment chamber is built up so that corrugated board stacks can be placed side by side or after each other depending on the dimensions of the corrugated board sheets. To obtain a good sealing around the corrugated board stacks 16, which has been found to be technically necessary, the treatment chamber or channel 1 is supplied with vertically and laterally adjustable sealings 2,3. The lateral sealings consist of a) the walls of the treatment chamber, of which one by means of hydraulic cylinders 15 can be pushed along grooves or guides, and of b) sealing baffles 12 oblique to the direction of the air flow which are pressed against the corrugated board stack 16 by the air flow. The top sealing is carried out by means of vertically adjustable sealing means of telescope type, which are adaptive to the width of the treatment chamber and are hydraulically pushed against the top of the corrugated board stack 16. Moreover, the device has a circulation channel 4 for the treatment air, which consists of a closed loop connected to each side of the treatment channel 1. The direction of air flow is shown by an arrow 17.

The circulation channel 4 can be regarded as divided into zones, for heating of the treatment air, which is carried out when passing heat batteries 6, for moistening of the treatment air, which is carried out by means of steam-water nozzles 8, and here includes a dewatering grating 13 to remove water droplets from the air, for fire extinguishing, which is carried out by means of sprinklers 14 for water and/or steam, for cooling, which is carried out by letting off hot air through a vent 10 intended herefor, whereby a damper 7 is closed after said vent 10 and cooled air is taken in on the other side of the damper through an intake 11. Moreover, there are operating and control units to enable controlling of the process. The circulation channel is connected to a centrifugal blower 5, by means of which the air flow is provided.

The invention will be described in more detail in the following illustrative examples.

EXAMPLE 1

A hot air treatment of a finished corrugated board, composed of non-bleached test liners, basis weight 2 × 225 g/m$^2$, corrugating medium of semi-chemical birch pulp, C-flute basis weight 146 g/m$^2$ and a starch adhesive with phenol resin, was carried out at 190°C for 20 min with a centrifugal blower and an air velocity of 10 m/s.

The corrugated board was then cooled and reconditioned to 20°C and 65 percent R.H. with air at the same air velocity for 100 min. The final conditioning before testing took place for 48 hours in a conditioning room, which meant that the corrugated board was brought to a moisture ratio of 7 percent.

The stiffness was evaluated as edgewise compressive strength, flat crush resistance and pin adhesion strength at 20°C and 65 percent R.H. and after immersion in water at 20°C for 1 hour. Table 2 shows the results as residual wet stiffness after 1 hour water immersion as a percentage of the strength of the non-treated board at 20°C and 65 % R.H.

Table 2

| Quality | Edgewise compressive strength % | flat crush resistance % | pin adhesion strength | |
|---|---|---|---|---|
| | | | liner 1 | liner 2 |
| non-treated | 10 | 7.5 | 1 | 6.5 |
| hot air treated | 31 | 30 | 31 | 15 |

The hot air treatment at 170°C, 15 m/s, required 83 min, and that at 210°C, 12 m/s required 6 min to obtain the same result. The brittleness of the corrugated board had increased due to the hot air treatment so that the puncture resistance at 23°C and 50 percent R.H. had become 10 percent lower than that of non-treated corrugated board.

When non-treated and hot air treated corrugated board were passed through a die cutter punching out corrugated blanks, no difference between them could be observed. On the other hand difficulties arose in this die cutter with corrugated board whose moisture ratio was only 4 % whether the corrugated board was hot air treated or not.

EXAMPLE 2

In order to examine how the corrugated board should be reconditioned after hot air treatment, air of 90 percent R.H. 80 percent R.H., 70 percent R.H. and 50 percent R.H. respectively at 20°C and velocity of 10 m/s was blown through the flutes of the hot corrugated board. Table 3 shows the blowing time necessary to attain equilibrium moisture ratio of 7 percent. If air of 50 percent R.H. was used, an unrealistically long blowing time was necessary.

Table 3

| R.H. (%) of the conditioning air | Reconditioning time (min) |
|---|---|
| 50 | >600 |
| 70 | 120 |
| 80 | 60 |
| 90 | 20 |

The reconditioning time was reduced if the temperature of the air used was increased up to 80°C but at a higher air temperature than 90°C it was impossible to attain a sufficiently high R.H. in the chamber for a reasonable moisture absorbing velocity to be maintained.

EXAMPLE 3

Reconditioning of finished corrugated blanks was carried out in batches in a treatment chamber where two stationary stacks connected in series, whose height was 1.5 m, were reconditioned by means of a centrifugal blower with recycling of air through a moistening zone, in which the air was moistened by means of vapour-water nozzles. For good top and bottom sealing the stacks were pressed hydraulically against the wall of the conditioning chamber. Sealing at the top of the stacks was carried out by means of solid sealing plates inclined to the direction of flow of the air and mounted on the roof of the treatment chamber. These were pressed against the corrugated board stack by the air pressure. The other wall side, the door side, was adjustable and had short, resilient sealing plates as above. The air velocity during the test was 6 m/s. Moistening was achieved with saturated vapour at a pressure of 6.0 kp/cm$^2$ and water at 20°C. The vapour flow was lowered stepwise from 14 to 4 kg vapour per hour and nozzle so that the relative humidity in the treatment chamber was somewhat below 100 percent R.H. The water flow due to this was 20 to 15 e/h and nozzle.

FIG. 2 shows the relative humidity of the reconditioning air versus the reconditioning time for the blow-in and blow-out ends respectively in the corrugated board stack in the treatment chamber. In this run a reconditioning time of 28 min was necessary and the moisture ratio of the corrugated board after the conditioning was 8 percent right out at the blow-in end and 6.5 percent right out at the blow-out end.

EXAMPLE 4

The hot air treatment of finished corrugated blanks was carried out in batches in two stationary corrugated board stacks connected in series, the hot air being circulated (a) by means of a centrifugal blower recycling the air through electric batteries having a maximum effect of 70 kW, and (b) by means of an axial fan, new hot air, on the pressure side of the fan being, continuously generated by heating the air with combustion gases from gas burners. In both cases a treatment temperature of 200°C and an air velocity of 8 m/s were used, and the optimal treatment time appeared to be 12 min. The subsequent cooling and conditioning were carried out with air at 70°C and 70 percent R.H. The reconditioning time to obtain 7 percent moisture ratio in the corrugated board was then 2 h. Each treated stack was 150 mm high, 2,000 mm wide and 1,500 mm long and contained 30 corrugated blanks. This corrugated board consisted of liners of sulphate pulp and NSSC-pulp of spruce/pine, basis weight 2 × 200 g/m$^2$, corrugating medium of semi-chemical pulp, C-flute, basis weight 112 g/m$^2$, and a starch adhesive with resorcinol resin. Table 4 shows the compression resistance determined in two climates and with the reference conditions at 23°C and 50 percent R.H. of boxes that were non-treated curtain waxed, hot air treated and hot air treated plus curtain waxed. For the curtain waxing "Mobil cote 433" from Mobil Oil with 30 g/m$^2$ wax was used. The values indicated in the Table apply to boxes hot air treated both with a centrifugal blower and an axial fan, since there seemed to be good agreement between the two tests.

Table 4

| Quality | Compression resistance in kp. | | |
|---|---|---|---|
| | 23°C, 50% R.H. | 20 min.rain of intensity 20 mm/hour. | 1 hour water immersion |
| non-treated | 534 | 104 | 41 |
| non-treated + wax | 533 | 160 | 46 |
| hot air treated | 564 | 162 | 82 |
| hot air treated + wax | 579 | 235 | 88 |

The combination of hot air treatment and curtain waxing gave surprisingly good results.

EXAMPLE 5

A number of corrugated board sheets as in Example 1 but impregnated with a solution of 0.5 percent of $Cu(NO_3)_2$, giving a Cu-content in the material of 0.2 percent were hot air treated at 190°C, 10 m/s. It appeared that only half the previous treatment time was required to obtain the same wet stiffness result. The reduction in puncture resistance of the treated corrugated board was also 10 percent in this case. Similar results were obtained when the corrugated board was impregnated with $Fe(NO_3)_2$, $FeSO_4$ or with weakly acid solutions of, for instance, aluminum sulphate.

EXAMPLE 6

Finished corrugated board was impregnated with 1 percent and 5 percent respectively of a thermosetting phenol resin with a high formaldehyde:phenol ratio and with a medium degree of precondensation.

Stacks of the impregnated corrugated board were hot air treated at 170°C, 5 m/s for 10 min and then reconditioned to a moisture ratio of 8 percent. The wet stiffness then increased from about 10 percent to 35 percent and 41 percent respectively measured as edgewise compressive strength after 1 hour water immersion. The decrease in puncture resistance of this corrugated board at 23°C and 50 percent R.H. was only 15 and 22 percent respectively. In converting tests in a die cutter for corrugated blanks no difference between non-treated and impregnated corrugated board could be observed, as long as both types had a moisture ratio of 8 percent.

In tests with other thermosetting resins similar results were obtained. The optimal treatment time and treatment temperature vary however with the type of resin chosen.

What we claim is:

1. A device for obtaining wet stiffness of corrugated board, comprising chamber means for receiving at least one stack of corrugated board, the flat surfaces of said board being substantially horizontal, means for sealing the top, bottom and sides of said at least one stack, such that all air is forced to pass through the flutes of the corrugated board, the flutes of the corrugated board being connected in both ends with recirculation channel means, said recirculation channel means including a circulation blower, heat batteries, air exchange valves, vapour and hot water nozzles and means for controlling the circulation air.

2. The device of claim 1, wherein said sealing means are vertically adjustable so as to press against the top of said stack, and laterally movable to adapt said chamber to different sizes of said corrugated board stack.

3. The device of claim 1, wherein the recirculation channel means has the capacity to provide air heated to a temperature between 170° and 250°C.

4. The device of claim 3, wherein there is a capacity to keep the heated air at a velocity between 3 and 15 m/s.

5. The device of claim 1, wherein the recirculation channel means has the capacity to pre-moisten air sufficient that the stack attains a moisture content of 5 – 12 percent.

6. The device of claim 1, wherein at least one of the components of the corrugated board in said stack is provided with at least one metal salt having a metal ion with high redox potential added thereto.

7. The device of claim 1, wherein at least one of the components of the corrugated board in said stack is provided with a thermosetting resin added thereto.

8. A device for obtaining wet stiffness of corrugated board, comprising chamber means for receiving at least one stack of corrugated board formed from linear and corrugated medium components being free from thermosetting additives and bonded together by sizing with an adhesive selected from the class consisting of synthetic adhesives and starches and mixtures thereof, the planes of said stack being substantially horizontal, means for sealing the top, bottom and sides of said at least one stack such that all air is forced through the flutes of the corrugated board, the flutes of the corrugated board being connected in both ends with a recirculation channel, which is provided with circulation blower, heat batteries, air exchange valves, vapour and hot water nozzles and means for controlling air which circulates within said device together having the capacity to blow air pre-heated to a temperature in the range of 185°–210°C with a velocity in the range of 3–15 m/s through the flutes of said corrugated board and subsequently blowing cooling air of a lower temperature and finally blowing pre-moistened air of less than 90°C having at least 60 percent relative humidity through said stack to provide a moisture content in said corrugated board in the range of 7–10 percent.

9. The device of claim 1, wherein the chamber is provided with vertically and laterally adjustable sealings, said lateral sealings consisting of the walls of the treatment chamber of which one wall by means of hydraulic cylinders can be pushed along grooves or guides, and said vertically adjustable sealing means being adaptive through hydraulic means to the width of the treatment chamber.

10. The device of claim 9, wherein the lateral sealings further comprise sealing baffles oblique to the direction of the air flow which are pressed against the stack by the air flow.

* * * * *